No. 702,168. Patented June 10, 1902.
H. B. WILLIAMS.
SIDE SEAM SOLDERING MACHINE.
(Application filed May 3, 1901.)
(No Model.) 3 Sheets—Sheet 1.
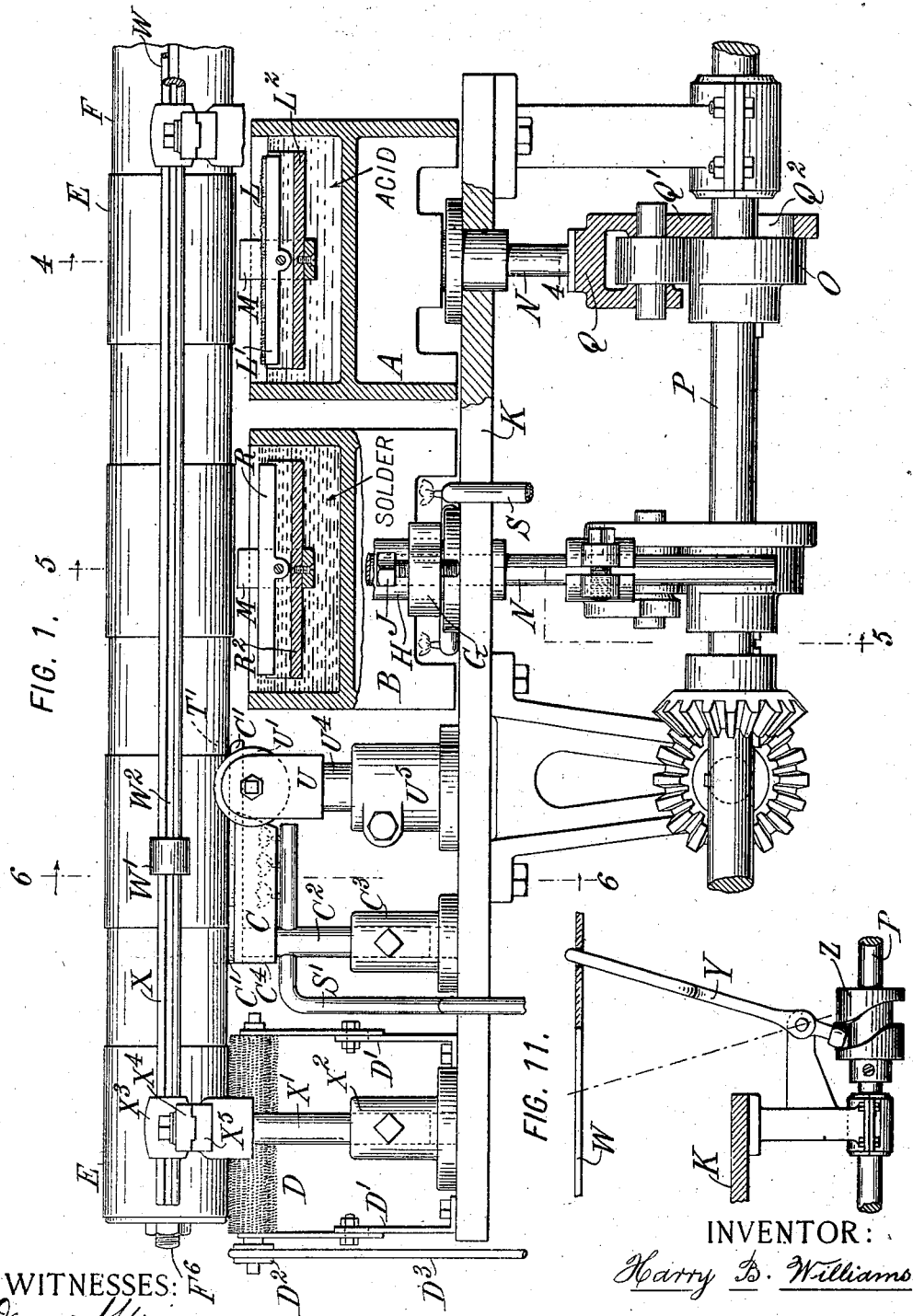
INVENTOR:
Harry B. Williams,
By Attorneys,

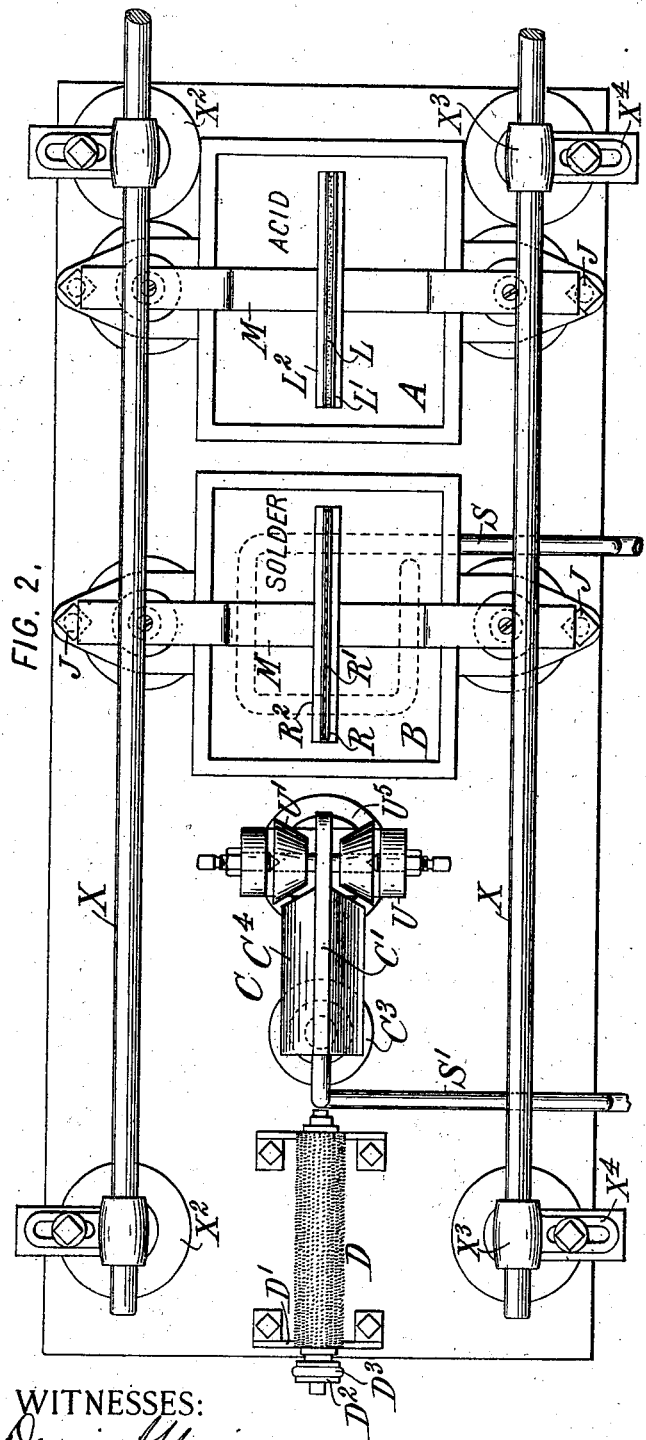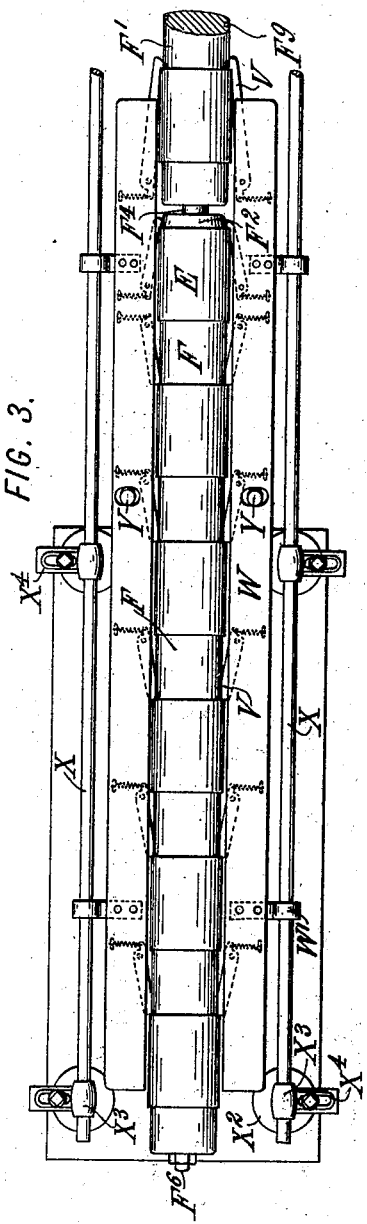

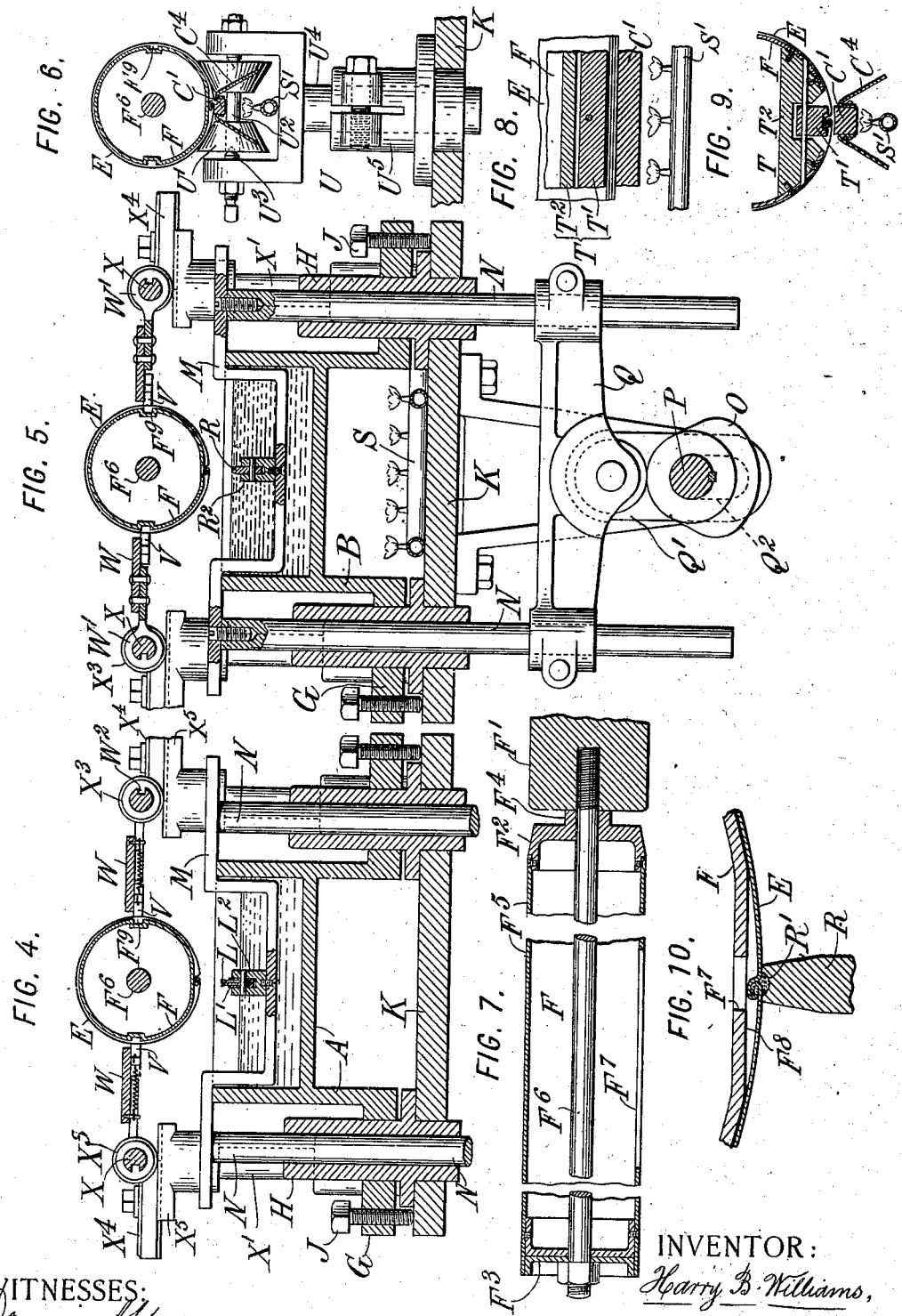

UNITED STATES PATENT OFFICE.

HARRY B. WILLIAMS, OF BROOKLYN, NEW YORK, ASSIGNOR TO AMERICAN CAN COMPANY, OF NEW YORK, N. Y., A CORPORATION OF NEW JERSEY.

SIDE-SEAM-SOLDERING MACHINE.

SPECIFICATION forming part of Letters Patent No. 702,168, dated June 10, 1902.

Application filed May 3, 1901. Serial No. 58,573. (No model.)

*To all whom it may concern:*

Be it known that I, HARRY B. WILLIAMS, a citizen of the United States, residing in the borough of Brooklyn, county of Kings, city and State of New York, have invented certain new and useful Improvements in Side-Seam-Soldering Machines, of which the following is a specification.

My invention aims to provide a new and improved soldering apparatus especially adapted for the soldering of the side seams of can-bodies, whereby only so much solder is used as is necessary for the seam and whereby the solder is sweated properly into the seam.

My invention aims also to provide an improved apparatus of the type stated which has various other features of advantage, as will be hereinafter more fully explained.

Referring to the accompanying drawings, showing an embodiment of my invention, Figure 1 is a side elevation of substantially the entire machine, certain parts being in section. Fig. 2 is a plan omitting the horn which carries the cans and the mechanism for moving the cans along. Fig. 3 is a plan of the horn and can-forwarding mechanism. Fig. 4 is a section on the line 4 4 of Fig. 1. Fig. 5 is a section on the line 5 5 of Fig. 1. Fig. 6 is a section on the line 6 6 of Fig. 1. Fig. 7 is a longitudinal section of the horn. Figs. 8 and 9 are longitudinal and cross sections, respectively, of a modification of the horn at a point adjacent to the sweating-bar. Fig. 10 is an enlarged view showing the operation of the solder-applying iron, the proportions of the parts being slightly distorted to show clearly the operation. Fig. 11 is a side view of the can-forwarding bar and a means for reciprocating it.

In most of the machines now in use for soldering side seams of can-bodies the solder is applied over an excessive portion of the metal at each side of the seam, which results in a great waste of solder. Also it is necessary in existing machines to maintain the melted solder at a quite high temperature in order to insure its being sufficiently liquid to close the seam at all points, the high temperature resulting in a rapid oxidation of the solder, and consequently considerable loss. By means of the apparatus herein shown I apply only a narrow coating of solder to the seam, extending at each side only a sufficient distance to insure the closing of the seam, thereby saving solder and making a neat joint. I also maintain the solder-bath, from which the solder is supplied to the seam, at a comparatively low temperature, just sufficient to keep molten, whereby very little dross is formed, the solder being supplied from this bath to the seam and being subsequently remelted and sweated into the seam at a higher temperature. The preferred arrangement of the mechanism for accomplishing this purpose comprises a horn, along which the cans are forwarded in succession, such horn being preferably a continuation of the horn of any suitable can-body-forming machine, the seam being on the under side of the horn, a solder-bath under said horn, in which the solder is maintained at a low fusing temperature, and means for applying a portion of the molten solder to the seam while the can-body is held stationary above such bath, a sweating-bar being arranged below said horn at a succeeding stopping-point of the can, which sweating-bar is maintained at a high temperature and which is arranged to press against the seam upon which the solder has been applied, so as to sweat the solder into the seam.

Referring to the drawings, A B C D indicate, respectively, the acid-bath, solder-bath, sweating-bar, and brush for removing surplus solder. The cans E are forwarded in succession from the can-body-forming machine intermittently to successive positions above the acid-bath, the solder-bath, the sweating-bar, and the brush, resting at each of said points long enough for the desired operation. The four operations stated are carried out simultaneously upon four successive cans, the seam, as indicated in Figs. 4, 5, and 6, being on the under side. The cans are forwarded, preferably, on a horn F, which is a continuation of the horn F', Figs. 3 and 7, of any suitable body-forming machine. At each operation of the machine the can at the right in Fig. 1 receives a supply of acid. The next can, which has already received its acid, receives a coating of solder along the outside of the seam or along both the outside and inside, as desired. The third can is pressed against a hot sweating-bar either on the outside alone or on both sides, as desired, and is then wiped by a forward movement along said bar or bars, and the fourth can is brushed to remove surplus solder on the outside of the seam. According to my broad invention the details of the several mechanisms by which these or any of these operations are carried out are immaterial. In the particular machine illustrated I have, however, shown specific forms of each of the various tools which I consider to be suitable for carrying out my invention.

The receptacles in which the acid-baths A and B are carried are substantially identical and of any suitable form. They may conveniently be provided at each side with a lug G, which are guided upon hollow posts H, Figs. 4 and 5, hereinafter referred to. Through the lugs G are passed adjusting-screws J, which bear upon a table K and which serve to determine the elevation of the receptacles. The lugs G are of sufficient thickness to have a good bearing on the posts H, so as to prevent tilting of the receptacles. The posts H are flanged, as shown, and carried directly upon the table K.

The acid is applied to the can-body by reciprocating a wick L into the acid-bath while the can is moving and up against the seam while the can is resting. This movement is preferably accomplished by supporting the wick upon a cross-bar M, depressed at the center and attached at its ends to vertically-reciprocating rods N, which are guided in the posts H. Any desired means may be employed for giving the rods N a reciprocatory movement. I have designed for this purpose the arrangement shown in Figs. 1 and 5, in which a cam O on a driving-shaft P acts upon a cross-bar Q, which is adjustably connected at its end to opposite rods N. The cross-bar Q has preferably a depending leg $Q'$ at the center, which carries a slot $Q^2$ for guiding the cross-bar on the shaft P. The wick L is preferably mounted directly in a U-shaped holder $L'$, which is transversely pivoted in a bar $L^2$, these parts being all arranged longitudinally of the can. The bar $L^2$ is supported crosswise upon the bar M and attached thereto, as shown in Figs. 1 and 4. By reason of the pivoting of the wick-holder $L'$ in the bar $L^2$ the wick when it is pressed upward against the can-body presses with substantially equal force at all points in its length, automatically swinging on the pivot until it assumes such a position. The solder-applying tool R is also preferably supported upon a cross-bar M and reciprocated by means of rods N, operated from a cam O, as explained with reference to the acid-wick L. The soldering-iron may be of steel and is preferably shaped as shown best in Fig. 10, tapering at its upper end and having a groove $R'$, which dips up a bead of solder when the tool is moved into and out of the molten solder in the bath B. Upon being moved into contact with the seam of the can E, as shown in Fig. 10, a coating of solder is applied along the entire length of the seam. In practice I use a somewhat smaller groove $R'$ than that shown, it being desirable, of course, to apply as small a quantity of solder as will serve the purpose. Upon the soldering-iron R being withdrawn from the can the portion of solder which was actually in contact with the can remains thereon in the form of a narrow coating, as explained. The tool R is transversely pivoted to a supporting-bar $R^2$, so that it will seat itself evenly against the can and bear equally at all points, the bar $R^2$ being supported upon the transverse bar M, as shown. The heater for maintaining the solder molten may consist of a single coil of gas-pipe S, having burners arranged as shown and resting directly upon the table. Preferably the solder-applying tool R is longer than the longest can which it is proposed to use, and the forwarding mechanism is so arranged that the rear end of the can to which solder is being applied is directly above the rear end of the tool R, as shown in Fig. 1, in which position the can is just about to receive its forward movement, and the tool R is lowered out of contact with the can. I may, however, adjust the position of the cam O relatively to the can-forwarding mechanism in such a way that the can receives its forward movement while the tool R is in contact with the seam a moment before the tool is lowered. By such an arrangement the forward edge of the can-body scoops a portion of the solder from the groove of the tool into the inside of the can-body and along the seam on the inside, for a purpose hereinafter explained.

The sweating-tool C comprises, preferably, a bar of copper $C'$, supported at its forward end upon a post $C^2$, which is adjustably carried in a socket $C^3$ on the table. The bar $C'$ is arranged with its upper surface close to the under surface of the horn, so that when a can-body is forced between the two the weight of the horn causes the seam to be pressed against the sweating-bar. This bar is preferably of copper, so as to hold the heat, and may be heated from a gas-pipe $S'$ and burners under the bar. To prevent the escape of the heat, the bar is preferably provided with sheet-metal screens $C^4$ on its sides. The sweating-tool being stationary bears for a considerable time against the can, so as to maintain the coating of solder previously applied to the same at a high heat and very fluid. The forward movement of the can then causes the solder to be wiped into the seam by the sweating-tool in a very efficient manner and so as to entirely close the seam.

If it be desired to apply solder to the seam on the inside of the can as well as on the outside, I may provide for such operation by providing an internal sweating-tool in addition to the tool C and by arranging the operating mechanism so as to secure a certain quantity of solder on the inside of the can by giving the can a forward movement while the solder-applying tool R is in contact with the seam, as explained above. A suitable form of internal sweating-tool is shown at T in Figs. 8 and 9, and comprises a sweating-bar T', preferably of copper, which is transversely pivoted in a block T², attached to the horn F. The heat from the lower bar C' is radiated to the upper bar T' in sufficient quantity to maintain the upper bar hot enough to melt the solder which has been supplied to the inside of the seam. As the can-body moves along the bar T' the latter distributes the solder, which is principally in the forward end of the can, along the entire length of the seam and then sweats it and wipes it in substantially the same way as explained for the lower sweating-bar. The transverse pivoting of the bar T' insures an even bearing on the seam, the rear ends of both bars T' and C' being rounded, as shown in Fig. 1, to enable the can to enter easily between the two bars.

The brush for removing surplus solder may be of any suitable construction. A very simple arrangement consists in providing a long cylindrical brush D, Fig. 1, in such a position that the can always bears slightly against the brush. Such a brush may be conveniently supported in adjustable uprights D' on the table, extending at one end to receive a pulley D², driven by a belt D³ from a suitable source of power—as, for example, the shaft P. By the provision of this brush the seam is made to have a neater appearance and the surplus solder which is brushed off may be saved and used again.

Though I contemplate the use of any suitable means for supporting and forwarding the cans in the desired position, I prefer to employ a horn forming a direct continuation of the horn of any suitable can-body-forming machine. Preferably also I employ my machine in connection with a body-forming machine which ejects the bodies with the seam on the under side; but this is not essential, as the seam may be turned to the desired position before conducting the can-body to the horn of my improved machine, or, indeed, as my machine may be used independently of and disconnected from the body-forming machine. In Fig. 7, which shows a suitable form of horn, F' represents the discharge end of the horn of the can-body-forming machine, and F the horn of my improved soldering-machine. The latter may be made light and cheaply of a metallic cylinder F⁵, having opposite cast end heads F² and F³, to which it is attached in any suitable manner. The head F² may be provided with a reduced extension F⁴. A rod F⁶ passes longitudinally through the horn F and screws into the end of the horn F'. This connection provides the necessary flexibility to permit the weight of the horn F to press the cans against the sweating-tool, as explained. By unscrewing the nut from the outer end of the rod F⁶ the entire horn F may be removed and replaced by another of different size or construction, as desired. The cylinder F⁵ has on its under side throughout the main portion of its length a slot F⁷, so that when the soldering or acid-applying tools are brought up and there is no can in place to receive them they will not touch the horn and leave an undesirable coating of solder or acid thereon. Throughout its length the horn is also provided with a flat face F⁸ on the under side, Fig. 10, to provide the necessary space for the lapped edges of the seams.

In order to prevent unnecessary falling of the outer end of the horn F, I may provide a support U, Fig. 6, comprising a pair of conical rollers U' on a cross-shaft U² and simultaneously adjustable laterally by means of adjustable pivots U³, supported upon an upright post U⁴, adjustable in a socket U⁵ on the table.

The movement of the cans along the horn F, and preferably also from the horn F' onto the horn F, is preferably accomplished by means of reciprocating pawls which enter grooves F⁹ along opposite sides of the horn. As shown in Fig. 3, a series of spring-pawls V is employed for this purpose attached to a pair of bars W, which are given a reciprocating movement, as hereinafter explained. The bars W may be mere extensions of similar bars carried in the body-forming machine, or they may be supported from a pair of longitudinal bars X, which are in turn supported from uprights X', adjustably carried in sockets X² at the four corners of the table. The bars W may be attached to the rods X by means of sleeves W', attached to the bars W and having a tongue W² sliding in the groove in the rods X.

In order to adapt my improved machine to cans of various diameters, it is necessary to use horns of various sizes, and it is to provide for such variation in the size of the horn that the uprights carrying the several tools are made adjustable in height, as explained. It is necessary that the bars W should permit of lateral adjustment for the same purpose. To this end the rods X are supported upon the uprights X' by passing through sleeves X³, which have a slotted lateral extension X⁴, Figs. 1 and 2, arranged to slide laterally on the head X⁵ of the post X', a bolt passing through said slot for fastening the parts in any desired position of adjustment. The reciprocation of the bars W may be effected by any desired mechanism which is synchronized with the shaft P, or where my machine is attached to a body-forming machine the means in the body-forming machine for reciprocating such bar will be sufficient. Where my machine is used alone, a suitable reciprocating mechanism is shown in Figs. 3 and 11, which comprises a lever Y, extending at its forked upper end through slots in the bars W and having its lower end oscillated by means of a cam Z, set in the required position upon the main shaft P. The shaft P may be driven by any suitable gearing, as shown.

It is believed that the operation of the several elements of my improved machine will be clear from the foregoing description. The cans are forwarded step by step along the horn, are then held in position by the pressure of the various tools against them, while the bar W is moved back to its first position. The cans may be positively held in their position of rest, however, by any suitable mechanism, such as is well known to those skilled in the art.

It will be understood that my invention is not limited to the specific embodiment herein described. Various modifications of the same are possible to those skilled in the art without departure from the spirit of my invention.

I claim as my invention—

1. In an apparatus for soldering seams, the combination of a molten-solder receptacle and a reciprocating bar therein for applying a coating of solder to a seam, and separate means for melting said coating of solder and pressing it into said seam.

2. In an apparatus for soldering seams, the combination of a molten-solder receptacle and a reciprocating bar therein for applying a coating of solder to a seam, an iron, means for heating the same, and means for pressing said iron and seam together and simultaneously giving them a relative movement so as to melt the solder and wipe the seam.

3. In an apparatus for soldering seams the combination of a reciprocating solder-applying iron, a molten-solder receptacle in which said iron moves up and down for supplying said iron with molten solder, means for bringing the solder on said iron into contact with a seam to apply a coating of solder thereto, and means for remelting said coating of solder and pressing it into said seam.

4. In an apparatus for soldering seams the combination of a reciprocating solder-applying iron, a molten-solder receptacle in which said iron moves up and down for supplying said iron with molten solder, means for bringing the solder on said iron into contact with a seam to apply a coating of solder thereto, a second iron, means for heating the same, and means for pressing said second iron and seam together and giving them a relative movement so as to remelt the solder and wipe said seam.

5. The combination with a receptacle for molten solder, of means for supporting a can-body above such molten solder, and a vertically-reciprocating longitudinally-grooved bar in said receptacle for applying a portion of such molten solder to said can-body.

6. The combination with a receptacle for molten solder, of means for supporting a can-body above such molten solder, a vertically-reciprocating iron, and means for moving said iron into the solder to receive a supply thereof and upward to bring its supply of solder into contact with the can-body.

7. The combination with a receptacle for molten solder, of means for supporting a can-body above such molten solder, a vertically-reciprocating iron, and means for moving said iron upward to bring its supply of solder into contact with the can-body and downward away from said can-body while said can-body is stationary.

8. The combination with a receptacle for molten solder, of means for supporting a can-body above such molten solder, a vertically-reciprocating trough-shaped iron, and means for moving said iron into the solder to receive a supply thereof and upward to bring its supply of solder into contact with the can-body.

9. The combination with a receptacle for molten solder, of means for supporting a can-body above such molten solder, an iron, a support on which said iron is pivotally mounted, and means for reciprocating said support to move said iron into the solder to receive a supply thereof and upward to bring its supply of solder into contact with the can-body.

10. A solder-applying tool comprising a bar and a support therefor, said bar pivoted in said support, in combination with a molten-solder receptacle in which said tool moves up and down, substantially as specified.

11. A solder-applying tool comprising a trough-shaped bar R, and a support therefor, said bar pivoted in said support, in combination with a molten-solder receptacle in which said tool moves up and down, substantially as specified.

12. The combination of a horn F, bars W carrying pawls V, and means for reciprocating said bars to advance a series of can-bodies intermittently along said horn, a molten-solder receptacle and a vertically-reciprocating solder-applying bar in said receptacle.

13. The combination of an iron, a molten-solder receptacle for supplying said iron with molten solder in which said iron is mounted to move up and down, a horn adapted to carry a can-body, and means for moving said iron to bring the solder thereon into contact with said can-body, said horn being cut away to avoid receiving solder from said iron when there is no can thereon.

14. In an apparatus for soldering seams, the combination of a molten-solder receptacle and a reciprocating bar therein for applying solder to both sides of a seam, and separate means for melting said solder and pressing it into said seam on both sides.

15. In an apparatus for soldering seams, the combination of a molten-solder receptacle and a reciprocating bar therein for applying solder to both sides of a seam, a pair of irons opposite each other, means for heating the same, and means for pressing said irons toward each other and simultaneously passing said seam between them so as to melt the solder and wipe said seam on both sides.

16. In an apparatus for soldering the side seams of can-bodies, the combination of a horn adapted to receive said can-bodies, means for advancing a can intermittently along said horn, and a molten-solder receptacle and a reciprocating bar therein for applying solder to the seam of said can at one of its resting-points.

17. In an apparatus for soldering the side seams of can-bodies, the combination of a horn adapted to receive said can-bodies, means for advancing a can intermittently along said horn, means for applying solder to the seam of said can at one of its resting-points, and means for wiping said seam while it is moving.

18. In an apparatus for soldering the side seams of can-bodies, the combination of a horn adapted to receive said can-bodies, means for advancing a can intermittently along said horn, and a molten-solder receptacle and a reciprocating bar therein for applying solder to the seam of said can at one of its resting-points, and means for sweating said seam at another resting-point.

19. In an apparatus for soldering the side seams of can-bodies, the combination of a horn adapted to receive said can-bodies, means for advancing a can intermittently along said horn, and means for applying solder to the seam of said can at one of its resting-points, means for sweating said seam at another resting-point, and means for wiping said seam while it is moving.

20. In an apparatus for soldering the side seams of can-bodies, the combination of a horn adapted to receive said can-bodies, and a rod passing through said horn axially and adapted to be attached at one end to the horn of a body-forming machine, a molten-solder receptacle and a vertically-reciprocating solder-applying bar in said receptacle.

21. In an apparatus for soldering the side seams of can-bodies, the combination of a horn adapted to receive said can-bodies, and a rod passing through said horn axially and adapted to be attached at one end to the horn of a body-forming machine, and a support for the free end of said horn adapted to permit the passage of a can-body between itself and said horn.

In witness whereof I have hereunto signed my name in the presence of two subscribing witnesses.

HARRY B. WILLIAMS.

Witnesses:
ELIZABETH W. WILLIAMS,
FRANK C. B. PAGE.